United States Patent [19]
Ko et al.

[11] Patent Number: 5,620,762
[45] Date of Patent: Apr. 15, 1997

[54] TEXTILE FIBER-WORKING UNITS AND COMPOSITIONS FOR THEIR FIBER-WORKING SURFACE LAYER

[75] Inventors: Kenneth K. Ko, West Grove; James B. Krug, Pequea, both of Pa.

[73] Assignee: Armstrong World Industries, Inc., Lancaster, Pa.

[21] Appl. No.: 288,548

[22] Filed: Aug. 10, 1994

Related U.S. Application Data

[63] Continuation-in-part of Ser. No. 961,356, Oct. 15, 1992, abandoned.

[51] Int. Cl.⁶ ............................. B29D 22/00; D01D 5/24
[52] U.S. Cl. .................. 428/36.1; 428/36.3; 428/36.9; 428/36.91; 264/209.3
[58] Field of Search ................................. 428/34.1, 36.1, 428/36.3; 264/209.3; 524/432–436

[56] References Cited

U.S. PATENT DOCUMENTS

| | | | |
|---|---|---|---|
| 2,450,409 | 10/1948 | Baymiller | 19/143 |
| 2,636,878 | 4/1953 | Garrett | 260/83.3 |
| 2,811,752 | 11/1957 | Garrett | 19/143 |
| 2,858,283 | 10/1958 | Garrett | 260/8 |
| 2,860,382 | 11/1958 | Garrett | 19/143 |
| 3,785,022 | 1/1974 | Bowling et al. | 29/132 |
| 3,938,399 | 2/1976 | Delfiol et al. | 74/232 |
| 3,981,059 | 9/1976 | Dodson | 29/127 |
| 4,037,299 | 7/1977 | Smith | 29/130 |
| 4,327,044 | 4/1982 | Dolan et al. | 264/36 |
| 4,508,867 | 4/1985 | Sato | 524/434 |
| 4,530,866 | 7/1985 | Inaguma | 428/36 |

*Primary Examiner*—Charles Nold

[57] ABSTRACT

Described herein are textile fiber-working units and methods for preparing them. These units have at least one layer made of a mixture of a polyamide, a crosslinked acrylonitrilebutadiene rubber, a plasticizer and a crosslinking agent. This layer forms a ring and has an outer fiber-working surface which forms an endless path for processing fibers. The units are made by combining the ingredients to form a uniform blend which is then worked into a shape, heated to crosslink the rubber, and then producing the fiber-working unit using appropriate finishing techniques such as cutting, grinding, and polishing.

18 Claims, 1 Drawing Sheet

TEXTILE FIBER-WORKING UNITS AND COMPOSITIONS FOR THEIR FIBER-WORKING SURFACE LAYER

This application is a continuation-in-part of U.S. Ser. No. 961,356, filed Oct. 15, 1992, abandoned entitled "Textile Fiber-Working Units and Compositions for Their Fiber-Working Surface Layer."

BACKGROUND OF THE INVENTION

Field of the Invention

Cots and aprons (including roll covers) are textile fiber-working units, used in the textile industry for working fibers into yarn. In the textile drafting process, these elements provide a surface for guiding and controlling the fiber as it is converted into yarns.

Certain properties of the cot and apron are important because of the effect on the quality of the yarn which is made with it. Simultaneously, it is also important to have a fiber-working element which has a practical working life. Cots and aprons do have a limited life time. As they wear out during the drafting process, they are replaced with new units. Thus, there is a continuing need for new cots and aprons. Ideally, cots and aprons should have good fiber-working characteristics and also a long life time.

Presently, cots and aprons are made with elastomeric compositions. The elastomers were developed and utilized in preference to leather, since better wear properties and more lap resistance were obtained. Elastomeric compositions based on acrylonitrilebutadiene rubber are taught in U.S. Pat. Nos. 2,450,410; 2,450,409; 2,636,878; 2,811,752; and 2,858,283. Animal glue, surfactants, and polyelectrolytes are used to obtain desired fiber-working properties. The animal glue, in particular, is widely utilized in combination with elastomers for the fiber-working surfaces of cots and aprons. Even with these elastomer compositions, however, lapping continues to be a problem for cots and sometimes aprons. Furthermore, synthetic fibers have a greater lapping problem due to the higher attraction of the fiber for the working element's surface.

In addition to this, the use of animal glue or protein requires digestion in water before combining it with the elastomer in the composition. This is a cumbersome and disadvantageous preparation procedure. This preparation procedure, moreover, calls for the introduction of water which must be completely removed in order to obtain a good fiber-working unit.

Polymer compositions which are reported to be suitable for textile cots are shown in U.S. Pat. No. 4,508,867. This reference, however, requires the presence of halide additives. These are additives which are both hydroscopic and otherwise also detrimental to properties needed in the yarn working surface. The presence of these additives has been noted to cause the fiber-working surface to collect moisture. When such additives are present, smoothness is also a problem, the additive tending to cause surface blemishes. Compositions containing these additives have poor yarn-working characteristics.

If good properties are not maintained in a fiber-working unit, a poor yarn product is the result. The invention described herein provides fiber-working elements having good to excellent fiber-handling characteristics and good wear properties. Compositions are also described which form the fiber-working unit. These compositions, furthermore, are much more easily made into cots and aprons than the compositions which contain halide additives or rely on animal glue for lap resistance and other needed fiber-working properties.

SUMMARY OF THE INVENTION

The instant textile fiber-working units have at least one layer. The working unit (also known as an "element") comprises a layer with an outer surface which is an endless, fiber-working surface. The layer is circular, forming a cylindrical ring. The endless, fiber-working surface provides a flat, smooth surface for working the fibers. This layer and, therefore, its fiber-working surface, is formed with a mixture of a polyamide and a crosslinked acrylonitrilebutadiene rubber (NBR) which contains no halide salt.

Both cots and aprons are provided by the instant invention. The cots, preferably, have a single flexible layer while the preferred structure of the apron has the layer having the exterior (outer), endless fiber-working surface known as a "jacket", the "apron jacket", or "jacket layer", and also has a second, interior layer which is known as a "liner" or the "apron liner". The second, interior layer has an inner surface which forms the inner surface of the cylindrical ring. As used herein, "cylindrical" includes the volumetric shapes which can have the radius larger, smaller or equal to the length of the cylinder.

Reinforcing fiber can be used inside, away from the smooth, working surface. In a multi-layered structure, the fiber can be between the layers, embedded in a layer or partly embedded in a lower layer, with the other part of the fiber reinforcement being partly embedded in the contiguous, upper layer.

The polyamide successfully provides desired fiber-working properties and characteristics to the composition. The crosslinked NBR helps to provide dimensional stability by acting against thermoplastic flow. The mixture of polyamide and crosslinked NBR is at least about 6% by weight of the polyamide and a minimum of about 30% by weight of the NBR. A plasticizer is included at an amount of from about 2 to about 50 PPH (parts by weight per hundred parts by weight) of the polyamide and NBR combined. For crosslinking (or curing) the rubber, curatives are present in the mixture at an amount which is effective to crosslink the rubber. For good fiber-working properties, however, this composition must be free of (does not contain any) halide salt. Most particularly, the fiber-working layer is formed by a composition which does not contain any halides of lithium, magnesium, calcium, and zinc.

The fiber-working units can be prepared using a process which comprises mixing a composition comprising polyamide at an amount of at least about 6% by weight, a crosslinkable acrylonitrilebutadiene rubber at an amount of at least about 30% by weight, a plasticizer and a crosslinking agent, at a temperature sufficiently high to soften the polyamide and to form a blend. Said composition contains no halide salt additive. Optionally, however, a filler can also be added. The blend is then worked into a shape which is suitable to finish into the working unit. Preferably, this shape is a cylinder or circular. The shaped blend is then heated at a temperature sufficient to crosslink the rubber in the blend, and thereafter is finished to form the composition into a textile fiber-working unit. This will be a layer having a smooth fiber-working surface which forms an endless, circular path on the outside of the unit for working the fiber. The layer (and generally the unit itself) is cylindrical in shape and forms a ring.

BRIEF DESCRIPTION OF THE DRAWING

In FIG. 1, on fiber-working surface 1, the arrow indicates the continuous plane on the fiber-working surface.

Figure 3:
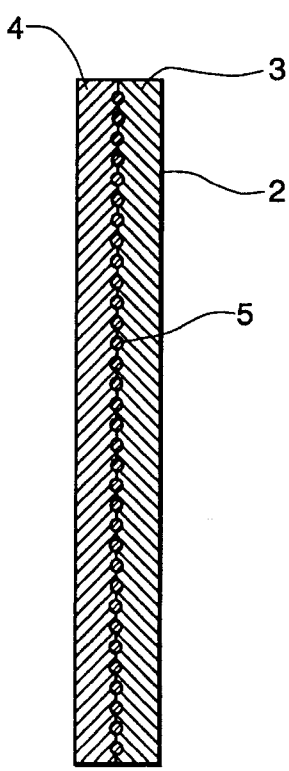

On the inside of the apron, as shown in FIG. 3, is reinforcing fiber 5, which is partly in the inner layer 4, and partly in the exterior layer 3 which forms the fiber-working surface 2.

DETAILED DESCRIPTION

Fiber working units such as cots and aprons are used in the textile industry. Cots and aprons are replaceable units (or "elements") in fiber drafting and spinning machines which draw and spin fiber to produce yarns. The term "yarn" refers to a continuous length of twisted textile fibers, which includes thread. Yarn is used for making fabric and other textile piece goods.

In processing textile fibers, the surface of the working unit must contact the fiber. Both the fiber and the yarn product which results from the procedure is directly affected by the fiber-working properties of the working unit itself. When other variables are constant, drafting and spinning systems having cots and aprons with more superior properties will generate a product with better quality. Cots are particularly important for yarn quality. To get quality yarn, good fiber-working properties must be maintained in the textile working units. By having a good fiber-working composition as the surface layer and by providing a good, smooth surface, the good and desired fiber-working properties are obtained in the fiber-working unit.

Suitable fiber-working surfaces for the production of quality yarn are obtained when the layer forming the working surface is a polyamide and crosslinked NBR mixture having no halide additives, particularly being free from the halides of lithium, magnesium, calcium, and zinc. If, however, the endless, fiber-working surface is formed by a preferred mixture of polyamide and rubber, the fiber-working unit can produce a yarn product of very good and even excellent quality. Physical measurement of yarn quality is performed with evenness testers (for example the Uster Evenness Tester from Zellweger Uster Ltd.). Measurements such as the coefficient of variation (CV) and the number of imperfections per 1000 meter of yarn at a given setting of the imperfection indicator, these imperfections being 1) the number of thick places, 2) the number of thin places, and 3) the number of neps.

Some of the properties (or characteristics) needed to have a unit with good fiber-working properties can be identified. Further, the fiber-working unit can be tested and rated for the property. These properties include lap resistance, resistance to generating clearer waste, abrasion resistance and dimensional stability. With preferred and most preferred embodiments of the instant invention, superior fiber-working properties are obtained.

The polyamide can be either a homopolymer or copolymer. When the polyamide is a copolymer, the amide moiety can provide at least about 6% by weight (wt.) of the amide to the polymer/rubber mixture. Preferably, it provides at least about 9% by weight of the amide moiety to the mixture. Due to the difficulties involved in the physical preparation of NBR/polyamide mixtures which are more than about 40% by weight polyamide, it is preferred to have a polyamide (homopolymer or copolymer) concentration which is a maximum of about 40% down to about 6% by wt. of the mixture, more preferably there is from about 9 to about 40%, and still more preferably cots and aprons have at least about 12 up to about 40% by wt. of the polyamid in the NBR/polyamide mixture for the preparation process.

By combining polyamide with rubber to form the surface layer (which has the fiber-working surface), lap resistance and resistance to generating clearer waste is given to the fiber-working unit. Resistance to the lapping of fibers on the surface (lap resistance) is very desirable in fiber-working units. Lapping can be particularly noted in cots. The fibers frequently "lap up" on the surface. The lapping tendency is associated with the electrokinetic phenomena (or the zeta potential) of the cot surface. Some types of fibers are particularly prone to lapping also. For example, the synthetic fibers such as rayon and polyester are particularly noted for their tendency to lap. A working unit with good lap resistance is particularly desired, especially for working synthetic fibers. The halide salt free polyamide/NBR combination gives lap resistance to these fiber-working units by including polyamide in the compositions which form the working surfaces.

For a suitably performing fiber-working unit, the polyamide is present at an amount of at least about 6% by wt. of the composition. An acceptable polyamide concentration is in the range of from about 6% to about 57% by wt. in the total composition. As the polyamide content decreases, however, the lap resistance of the unit deteriorates. Thus, for good to excellent lap resistance, it is preferred to have the polyamide concentration at an amount of at least about 9% by wt. of the composition. For lap resistance that is even better than the animal glue/rubber combination, a polyamide homopolymer is present at an amount of at least about 15% by wt. of the total composition (preferably from about 15 to about 40%), or if a copolymer of polyamide is used, it is preferably present at an amount of at least about 20% by wt. of the total composition.

Another desired characteristic is the resistance to generating fiber lint (waste) on the clearer board (referred to as clearer waste). The attraction on the part of the working unit surface for fiber tends to generate more clearer board waste. Fiber working units with the better property will consistently have less clearer waste. With the polyamide the present fiber-working units also have very low clearer waste generated. Even polyamide copolymers have been shown to have more resistance to forming clearer waste than glue-containing formulations of the prior art (which are recommended for lap resistance).

For dimensional stability in a fiber-working unit, at least some crosslinked elastomer is needed. The elastomer is present at an amount sufficient to provide elastic recovery to the unit, helping to give it a suitable lifetime, during which time undesired thermoplastic deformation is at least deterred if not prevented. Elastic recovery enables the unit to maintain and efficiently recover its original shape during the yarn-forming operation. Flute markings which tend to develop during textile processing will disappear because of elastic recovery. In addition to this, the elasticity will keep the fiber-working unit in its original shape, whereas a thermoplastic material would not, since the thermoplastic tends to flow and experience plastic deformation, especially with the effects of pressure and heat. Thus, the crosslinked NBR is present in the unit's surface layer at an amount sufficient to maintain the needed level of dimensional stability, preferably at least about 40% by weight of the composition and the layer forming the fiber-working surface is NBR.

The polyamide can be a linear molecule having the structure shown in formulas (1)–(4):

(1) $H_2NRNH(COR^1CONHRNH)_nCOR^1COOH$
(2) $H_2NRCO(NHRCO)_nNHRCOOH$
(3) $H_2NRNH(COR^1CONHRNH)_n(R^2)_mCOR^1COOH$
(4) $H_2NRCO(NHRCO)_n(R^2)_mNHRCOOH$

In these formulas, n and m are numbers which represent the number of repeating units in the polymer chain. R and $R^1$ are functional groups selected from the group consisting of aliphatic hydrocarbon moieties and aromatic hydrocarbon moieties. The formulas having $R^2$ are polyamide copolymers, $R^2$ being another distinct polymeric moiety. These polymeric moieties ($R^2$) are from monomers such as ethylene, propylene, ether, ester, vinyl chloride, urethane, vinyl acetate, ether-ester, and vinyl alcohol. Preferably, $R^2$ is a monomer selected from the group consisting of olefin, esters, and ethers.

In formulas (1)–(4), R and $R^1$ can suitably have from 3 to 30 carbon atoms. Preferably, the number of carbon atoms in R and/or $R^1$ is in the range of from 4 to 18; most preferably, both are in this range. Preferably, R and/or $R^1$ is an aliphatic; most preferably, both are aliphatic. Better properties are obtained in the fiber-working units when aliphatic groups are used.

Polyamides suitable for the present invention can either be obtained commercially or prepared using known technology and techniques. Commercially available polyamides which can be used in this invention include, for example, Nylon 6 (a polyamide having 6 carbons in the repeating unit in formula (2) above where R is $C_5$), Nylon 6,6 (polyamide of formula (1) above where R is $C_6$ and $R^1$ is $C_4$), Nylon 11, Nylon 12, Nylon 6.10 (polyamide of formula (1) where R is $C_{10}$ and $R^1$ is $C_4$), Nylon 6.12, Nylon 7, Nylon 8, and Nylon 9.

Other polymers and elastomers can be combined with the rubber and polyamide mixture. Polymers such as polyvinyl chloride, polyvinyl alcohol, polychloroprene, polyolefin, polyethylene and polypropylene are suitable; as are elastomers such as polychloroprene, ethylene-propylene terpolymer (EPDM), isobutylene-isoprene, epichlorohydrin. Such polymers and elastomers can be used as modifying fillers, to impart other desired properties (such as to toughen the polyamide/NBR blend). Acceptably, these are used at an amount up to about 45% by wt. of the total composition. The inclusion of such modifiers and fillers, however, sometimes sacrifices some fiber-working quality of the cot's surface. Thus, it is preferred to limit fillers in cots to a maximum of about 30%. In aprons where lap resistance is not as critical, fillers can be used at amounts up to about 45% by wt.

The rubber which is combined with the polyamide is NBR. The NBR can be either carboxylated or non-carboxylated. The NBR can be present at an amount of from about 30 to about 91% by weight; preferably it is present at an amount of from about 40 to about 89% by weight of the composition. For the high lap resistant formulations, the NBR is used at an amount in the range of from about 40 to about 82% by wt. of the composition. Suitably, the acrylonitrile content of the NBR is in the range of from about 10 to about 70% by weight; preferably it was in the range of from about 25 to about 50% by wt. of the composition.

Any polar plasticizer can be used to make the instant cots and aprons. One or more plasticizers can be used. The plasticizers used can be selected from the group consisting of triethylene glycol ester of $C_6$–$C_{10}$ fatty acids, triacetin, glycerol triacetate, tributoxy ethyl phosphate, methyl acetyl ricinoleate, trioctyl phosphate, polyester (linear)-poly(sebacate-glycol), triglycol dioctoate, polyester (linear)-poly(adipate glycol), butyl benzyl sebacate, capryl benzyl sebacate, 2-ethylhexyl diester amide, tributyl phosphate, fatty acid nitrile of $C_6$–$C_{20}$ fatty acids, polyether polyethylene glycol di-2-ethylhexoate, triglycol dihexoate, di(2-ethylbutyl cellosolve) succinate, di-butoxyethoxyethyl adipate, dioctyl styryl phosphonate, dibutyl benzene phosphonate, and dioctyl benzene phosphonate.

Acceptably, the plasticizer is used in the compositions which form the surface layer at an amount in the range of from about 2 to about 50 parts per hundred parts by weight (PPH) of the polyamide and NBR rubber combined; preferably it is present at an amount of from about 4 to about 30 PPH of the polyamide/NBR mixture.

In order to crosslink (or cure) the rubber, a vulcanization (or curing, or crosslinking) agent(s) is used. Such agents are well known, and any of these can be utilized. Such additives for curing the rubber include curing packages which contain a crosslinker, initiator, and accelerator. These curing additives are utilized in an amount effective to crosslink, initiate crosslinking, or to accelerate the rubber crosslinking. Sulfur and peroxides are both suitable vulcanization agents. Sulfur is a preferred additive for crosslinking and can be used at an amount in the range of from about 1 to about 15 PPH of the polyamide and NBR rubber combined. The accelerator can be included at an amount in the range of from about 0.5 to about 2.5 PPH of the polyamide and rubber combined. The initiator (such as zinc oxide) can be included at an amount in the range of from about 3 to about 10 PPH of the rubber and polyamide combined.

The initiator suitably can be zinc oxide, magnesium oxide, calcium oxide, or lead oxide. Zinc oxide is preferred. Accelerators are also well known, and any can be used. Preferred accelerators are the organic accelerators such as N,N-diisopropyl-2-benzothiazolesulfenamide, N-tert-butyl-benzothiazole-sulfenamide, benzothiazyl disulfide, mercaptobenzothiazole, tetramethylthiuram monosulfide, tetraethylthiuram disulfide, zinc dibutyldithiocarbamate, zinc dimethyldithiocarbamate, diphenylguanidine, and tetramethylthiuram disulfide.

A stabilizer will prevent premature vulcanization and the resulting degradation of the rubber during mixing. Stabilizers are well known additives and are commercially available. For example, commercially available stabilizers which can be used include Polyguard HR from Uniroyal Chemicals, organo-metallic stabilizers such as barium phenate (Lubrizol 2106 from Lubrizol Corp.), barium carboxylate complex (Lubrizol 2116); also available are stabilizers such as the cadmium oxide, barium oxide, and antimony oxide; organic heat stabilizers such as the hindered phenols which are commercially available as Irganox 1010, 1034, 1035, or 1098 from Ciba-Geigy can be used as well as the phosphite stabilizers such as Doverphos #4 from Dover Chemical.

Pigments, colorants, and antioxidants can also be used in the amount needed. Generally these are used at amounts in the range of from about 0.5 to about 3% by weight of the composition. Such ingredients are well known and are commercially available; any of such can be used.

In preparing the fiber-working units, the polyamide and the elastomer are blended together using suitable equipment for mixing. Additives which are included in the working unit—vulcanization (or curing) agents, stabilizers, antioxidants, pigments, plasticizers, processing aids, etc.—are also added to the blend at this stage. No halide salt additive, however, is included. In mixing the ingredients to form the blend, the ingredients can be combined in a single step or they can be combined sequentially in two or more mixing steps. Mixing is done using sufficient shear and temperature to obtain a homogeneous blend.

In one preferred process, all of the ingredients (including the additives) are mixed together in a single step. For another preferred process, mixing is done in two stages. The polyamide and NBR are mixed first and the curing agent is mixed in after a blend of the polyamide/rubber is obtained. All of the other ingredients can be added either in the first or second stage. For mixing the polyamide and rubber, the temperature is at least the minimum temperature needed for the polyamide to soften, preferably the nylon is flowable at that temperature.

In mixing the ingredients, care should be taken either to a) make sure that the mixing temperature does not exceed the vulcanization temperature of the rubber or b) take precautions to prevent crosslinking of the NBR during this step. Stabilizers can be used in an effective amount to prevent such crosslinking.

If the mixing temperature selected for the polyamide and elastomer (rubber) exceeds the vulcanization temperature, then, in a preferred process, the apparatus used to mix can be one that provides enough shear and temperature to obtain the mixture without premature vulcanization. For this procedure, a stabilizer is also used.

After these are mixed, the polyamide/rubber composition is formed into a suitable shape. The shape selected will allow the crosslinked rubber/polyamide mixture to be easily processed into the fiber-working unit. For either cots or aprons, this shape is generally a cylinder or spherical. Preferably the mixture is formed into the shape by extrusion. After forming the mixture into the shape desired, the piece is then wrapped and put into an oven to cure. The temperature is sufficiently high to vulcanize the rubber. The cured, vulcanized piece is then finished into the particular fiber-working unit needed.

In "finishing", the crosslinked piece is cut, ground or buffed into the cylindrical fiber-working unit having the smooth, fiber-working surface. In finishing, the fiber-working surface is buffed smooth, finishing it so that it is suitable for contacting, processing and working the fiber. The particular measurements of the finished cots and aprons are not critical, and any size (length, width and diameter) which the fiber drafting and spinning machine requires can be made.

If an apron is made, it is preferably treated to lower the coefficient of friction of the inner surface of the cylindrical apron. This allows the apron to move more smoothly when it is operating in the equipment.

Figure 1:
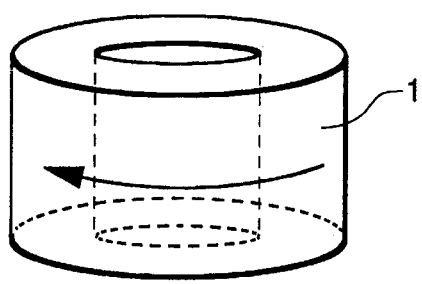
FIG. 1 shows a textile cot with the flat, smooth, continuous, fiber-working surface 1. In accordance with the instant invention, this surface is the outer surface of a layer of polyamide/NBR which is cylindrical in shape, the layer being like a ring.

For a cot, the composition is also finished into a cylindrical, ring shape. In its preferred and most simple embodiment, the cot is single pieced, having no second layer, as shown in FIG. 1. The cot, however, can also have a second layer (a liner) which could be made of materials such as a polymer, elastomer, or a metal ring. Such cots can further have a third layer in the cot's interior, for example, a fiber-reinforced layer.

Figure 2:
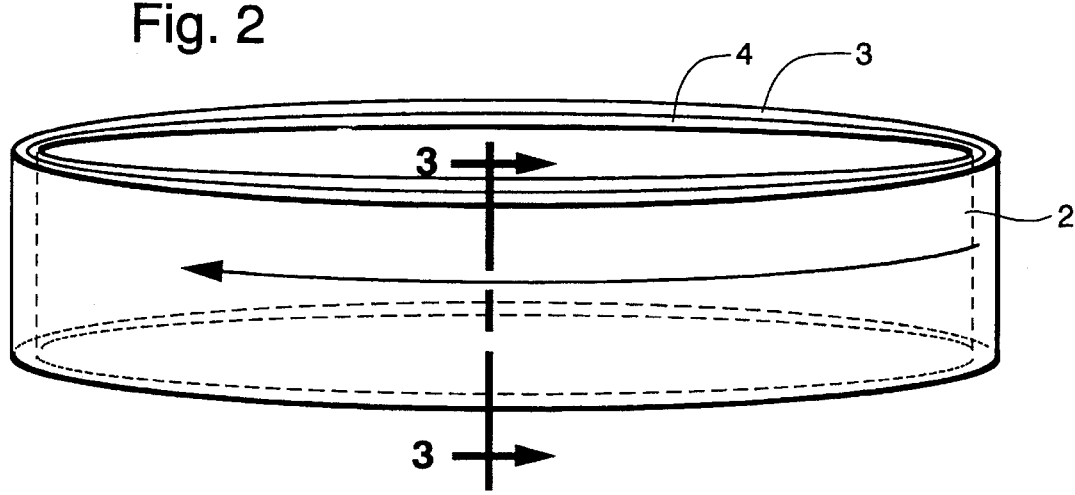
FIG. 2 shows an apron in a preferred embodiment. The apron is a continuous belt, being in the shape of a cylinder (or cylindrical ring), and having the flat, continuous, smooth, fiber-working surface 2 formed by an exterior (or outer) layer 3 of polyamide/NBR. In this embodiment, the exterior layer 3, also referred to as a jacket, is located on top of an inner layer 4. The outer layer has the same width as the inner layer and covers it exactly with no overlap. The inner layer 4, also referred to as a liner, in accordance with the instant invention, is a flexible, abrasion resistant polymer, such as polyamide. The abrasion resistance is important for the inner surface of the cylindrical ring.

For an apron, the piece is finished into a belt which is also in the shape of a cylindrical ring (note FIG. 2). Preferably, the aprons are two layered. Using this structure, the polyamide/rubber composition is finished into the "jacket" which is the surface layer. This jacket is put over the outside of a "liner".

The two-layered construction for the apron is known, and any of the methods and know-how familiar to those skilled in the art can be used in the fabrication of a multi-layered apron using the compositions described herein. When making an apron, the jacket has a cylindrical shape and an inner diameter which is a size that is effective to receive the liner and have it fit snugly. The liner also has a cylindrical shape and an outer diameter with a size which is effective to fit inside the jacket snugly. Suitably the jacket's inner diameter is equal to or slightly greater than the liner's outer diameter. Preferably the jacket's inner diameter is no greater than 0.08 inches larger than the liner's outer diameter.

The liner is fitted into the jacket so that a permanent ring is formed from the layers (the jacket and the liner) going together. In fitting the liner to the jacket, suitable means are used to adhere the two layers together to form the single-pieced, permanent, multi-layered cylindrical ring for an apron. To fit the liner to the jacket, the liner is placed inside the jacket so that the outer surface of the liner touches the jacket's inner surface all the way around the circumference of the jacket's outer surface. The plane of the jacket's inner surface is parallel to the plane of the liner's outer surface.

The liner is preferably made from an abrasion resistant composition, while the main consideration for the jacket is to have good fiber-working characteristics in its surface.

Preferably, both surfaces (the cylindrical liner's outer surface and the cylindrical jacket's inner surface) are prepared (finishing and washing) before fitting (inserting) the liner into the jacket. Plasticizer is used to soften both layers and even allow placement of fibrous cord when such is used. To help the liner adhere to the jacket, an adhesive could be used. Preferred embodiments include treatment of the liner exterior surface and inner surface of the jacket with a plasticizer. The apron can also have reinforcing fiber as a preferred embodiment. Preferably this is wound around the liner surface before it is fitted into the jacket. The liner exterior or the jacket interior or both the liner exterior surface and the jacket inner surface can be treated with either plasticizer, adhesive, or both a plasticizer and an adhesive followed by fitting the liner to the jacket.

Preferably, a cylindrical sheet of liner material is fitted to a cylindrical sheet of jacket material and then the apron is cut from the multi-layered sheet. This forms a multi-layered apron having a jacket and liner in layers that fit to each other exactly with no overlapping in either layer. In preferred embodiments, the liner and the jacket are long enough to allow several aprons to finally be cut from the fitted, multi-layered cylindrical ring. Surface finishing of the fiber-working surface is preferably done after cutting individual aprons from the fitted ring. If desired, the two-layered apron could be constructed using the techniques and methods discussed in references such as U.S. Pat. No. 2,455,362.

It is preferred to use fiber to reinforce the apron structure. This reinforcement can be partially or totally embedded in the liner and/or the inner surface of the jacket. Preferably it is between the liner and the covering jacket, being partially embedded in both the liner and the jacket as shown in FIG. 3. Preferably, the fiber is a fibrous cord, and it is wound in a circular or helical manner.

The liner preferably is abrasion resistant since the interior surface does contact parts in the machine during use. The polyamide/rubber jacket forms a fiber-working cover which has a reduced attraction for the yarn fiber to giving the finished fiber-working unit good fiber handling properties.

In the preferred apron embodiments, the liner and jacket fit together snugly and adhesive is not needed.

This is particularly true with the fiber reinforcement. If desired, however, an adhesive can be used between the jacket and the liner.

An apron liner, having the inner, exposed surface, is formed from a composition which gives the liner flexibility and abrasion resistance to the inner surface. Suitably, the apron liner is made of a polymer selected from the group consisting of: polyurethane, polyamide, polycarbonate, copolymers of acrylonitrilebutadiene rubber, and copolymers of acrylonitrile-butadiene-styrene. Most preferably the liner is a blend of the NBR and a polyamide.

In addition to the particular cot and apron structures that are described above, and shown in the figures, the instant polyamide/rubber fiber-working surface layer can be used as the fiber-working cover layer in any other cot or apron structure which can be selected. The fiber-working surface layer of polyamide/NBR will acceptably be at least about 0.5 mm thick, preferably at least about 1 mm thick. This layer can be combined in virtually any other cot and apron structure; for example, a multi-layered cot structure such as those shown in such references as U.S. Pat. Nos. 2,597,858; 3,785,022; 4,530,866; and 3,981,059. Apron structures which can be used are also found in patent references. Suitable structures are shown in such references as U.S. Pat. No. 3,938,399.

The size and proportions of the instant fiber-working units are not critical. They can be prepared in any size and thickness that is needed to fit into the textile fiber processing machines. Sizes, thus, can vary widely. It should, however, be emphasized that the proportions of the cots and aprons (such as overall diameter, width of the fiber-working surface, and the size of the aperture in the center of the unit) will be determined by the fitting requirements of the particular machine which it is to be used on.

The maximum thickness of the layer having the fiber-working surface (including cots) is not critical and will depend on factors such as whether the unit is a cot or apron, the particular structure selected, and even the particular kind of machine on which it is to be used. The thickness of the surface layer (jacket) of the apron can preferably range from about 0.5 to about 1.5 mm; the liner preferably ranging from about 0.5 to about 2 mm. The total overall thickness of the jacket and liner can be from about 1 to about 3.5 mm. Cots are thicker than aprons, the cot layer preferably being at least about 4 mm thick. In any fiber-working unit the working surface of the instant polyamide/rubber composition acceptably being at least about 0.5 mm in thickness.

Another property important for the fiber-working units is the abrasion resistance of the working unit's surface. If the working surface deteriorates with abrasion, the quality of yarn produced also deteriorates. With more abrasion resistance, the working unit will maintain a good surface for fiber-working and can generate high quality yarn for a longer period of time.

EXAMPLES

Procedure

Compositions of the instant invention were mixed, made into cots and tested. Example 18 is directed to aprons. The following procedure was used:

Powdered rubber, pigments, antioxidants, and the indicated polymer or copolymer of polyamide were mixed in a Henzel mechanical mixer, and the mixture was then fed into a twin screw, counter rotating extruder which was preset at a temperature slightly above the melting point of the polyamide (for Example 1 it was approximately 200° C.). The ingredients blended and fused homogeneously under the shear action of the extruder. After the extrudates cooled, they were placed on a two roll mill (or in a Banbury internal mixer) and the vulcanization reagents (ZnO, sulfur and accelerator) were added and dispersed uniformly into the extrudate. Thereafter, the mixture was extruded into the shape of a tube using an ordinary single screw extruder, and the tube was then vulcanized. After vulcanization, to finish the tube and obtain the fiber-working unit, the vulcanized tubes were ground, cut, fabricated, and polished. The outer, fiber-working surface was smoothed. The cots were then tested and used to determine the fiber handling properties, ozone resistance, and flute mark resistance. The testing procedures and resulting data are indicated in the examples which follow.

Example 1

This example demonstrates the use of polyamide and a carboxylated NBR in a cot. The polyamide used was Nylon 11. The formulation used is given below in percent by weight. In parts by weight, the polyamide was used at 30 parts per hundred parts of the rubber and polyamide combined.

|  | % by Wt. |
| --- | --- |
| Cbx. NBR[1] | 47.75 |
| Nylon 11 (Powder) | 20.46 |
| Plasticizer | 9.56 |
| Titanium Dioxide | 9.21 |
| Black Pigments | 0.20 |
| Antioxidant | 1.91 |
| Zinc Oxide | 3.41 |
| Accelerator[2] | 0.68 |
| Sulfur | 6.82 |

[1]"Cbx. NBR" - a carboxylated acrylonitrile-butadiene rubber; the rubber had about 1% carboxylation.
[2]The accelerator was N,N, diisopropyl benzothiazole sulfuramide.

The properties of this cot were tested, and the results are given below.

Lap Resistance Testing Procedure

The roll section of a standard Casa Blanca type spinning frame of U.S. manufacture was modified for this test. Only the roll section of the frame was needed. The ends of roving were allowed to issue untwisted from the front rolls and to lap at will. The front rolls were kept at the speed of about 300 rpm (revolution per minute) for the testing speed. A front roll weight of 40 pounds was used. An automatic time device was used for the operation of the roll for brief, predetermined periods of time, and likewise for brief, predetermined periods of rest between runs.

The equipment also had an automatic means of stopping the suction at the Pneumafil clearer independently of the drafting rolls. The apparatus, together with the roving, remained conditioning at 28° C., 42% RH all times.

When conducting the lap resistance test, the rolls (i.e. cots) were set in operation with the untwisted ends cleared to the cleaning system. With the rolls running clear, there is no clearer suction.

The rolls continue to run for a brief, predetermined period of time to determine if fiber laps around the cot at the period of time. Any laps which thus occur through loss of clearer action are noted for the scoring of that running period. After the time period finished, all lapping materials were cleared from the roll, and the cycle was repeated with a longer running period. To rate the lap resistance of the cot, all of the scores for each running period are added for the total lap resistance value. The tendency of a cot to lap when in contact with the fibers is indicated. The higher values show more lap resistance. This results in the following scoring system:

| Running Period (seconds) | Score with No Laps | Score with Laps |
|---|---|---|
| 2 | 2 | 0 |
| 4 | 4 | 0 |
| 6 | 6 | 0 |
| 8 | 8 | 0 |
| 10 | 10 | 0 |
| Total | 30 | 0 |

A total score of 21–30 is considered excellent lap resistance, 10–20 is considered good lap resistance, a total score of 1–9 is fair lap resistance, and a total score of zero is poor.

The lap resistance of a cot having the above formulation was obtained using the above described procedure.

Lap Resistance:

| Fiber Tested | Rating | Score |
|---|---|---|
| Cotton | Excellent | 30 |
| Rayon | Excellent | 27 |
| Polyester/Cotton[1] | Excellent | 25 |

[1] For the Examples which follows the polyester/cotton used was a 65/35 blend.

Yarn Quality Parameters:

The quality of the yarn is shown herein by measurements of its irregularity (referred to as the coefficient of variation CV) and the faults which are frequently occurring "imperfections" in yarns generated from the drafting process. The measurements of yarn quality in this and the following examples were made with the Uster Evenness Tester (manufactured by Zellweger Uster Ltd. of Switzerland).

Percent coefficient of variation (% CV) is a numerical assessment of the irregularity of a yarn as measured with the Uster Evenness Tester. The tester measures the amount of yarn passing through and the variations in the yarn as it passes. The % CV is shown by the tester as the percent mean deviation. This is a direct measurement of the yarn being tested and expresses the degree of irregularity in the yarn. The number of imperfections are the total number of thin places, thick places, and neps. These three irregularities are defined and recognized by the tester as follows:

- A "nep" is a fault length of 1 mm having a cross-section 200 percent of the average value.
- A "thick place" is a fault length of approximately the fiber stable length having a cross section of about 50% increase over the average value.
- A "thin place" is a fault length of approximately the fiber stable length having a cross section of about 50% less than the average value.

Clearer Waste Test Procedure:

Freshly buffed and conditioned cots were fitted into an arbor (two cots per arbor) on a standard Casa Blanca type spinning frame of U.S. manufacture. The frame was set up to spin a carded cotton roving of 0.88 hank, single creel, with: a front roll speed of about 135 revolutions per minute, a front roll weight of 30 pounds, total draft of 23.5, and spindle speed of 9500 RPM.

To break in the cots, they were put through an initial period of six hours running time. To begin the period, the ends were pieced up and yarn spun for six hours with revolving clearers in place. Then the frame was reset for the test. The total testing time was six hours.

For the test, the flat clearers were installed and after every two hours the frame was shut down and the clearer waste was removed and put in an envelope for each individual arbor. Then the arbor was moved over one position, flat clearers were reinstalled and the frame was run for the next two hours. Thereafter, the removal of clearer waste was repeated, the arbors were moved over one position with flat clearers and the final two hours were completed. At the end of the test the clearer waste was removed, combined, weighed, and divided by the number of cots tested times six to determine average waste in milligrams per cot hour.

| Parameters Indicating Yarn Quality: (measured for 30 count 100% cotton yarns) | |
|---|---|
| % CV | 12.1 |
| Thins | 2.0 |
| Thicks | 18.0 |
| Neps | 37.0 |
| Break Factor | 2850.0 |
| Clear Waste (mg/hr) | 6.35 |

A comparison example with Comparative Example 17 shows that polyamide in a cot formulation has performances that actually exceed those exhibited by the conventional animal glue-containing cots.

Example 2

Another cot was prepared and tested using the formulation of Example 1 except that the polyamide was a pelleted Nylon 11.

The cot was then tested and the data is given below:

| Shore A Hardness | | 87–88 |
|---|---|---|
| Lap Resistance: | | |
| Fiber | Rating | Score |
| Cotton | Excellent | 28.5 |
| Rayon | Excellent | 26.5 |
| Cotton/Polyester | Excellent | 30.0 |
| Clear Waste (mg/hr) | 7.03 | |
| Ozone Resistance[1] | Pass | |
| Flute Mark Resistance[2] | Pass | |

[1] In the ozone resistance test the cot sample was put in a closed box containing 4 ppm (parts per million) of ozone. The cot passes the ozone resistance test after 24 hours if no cracks appear on the cot surface.

[2] Flute mark resistance indicates suitable resistance of the cot to viscoelastic creep relaxation. The Flute Mark Test was run on a section of a standard Casa Blanca type spinning frame of U.S. manufacture, suitably modified for testing purposes. The front roll was set to run at about 160 revolutions per minute and a front roll weight of 45 pounds was selected. The cots fitted in arbors were placed against the fluted steel axials on the flute mark tester, weighted and permitted to remain static for 68–72 hours. The cots were then removed and using a Top Roll Analyzer, the depth of the flute mark in each individual cot was measured and recorded. The cots were then replaced on the frame and run for two hours at which time they were again removed and allowed to cool to room temperature.

After cooling the depth of any remaining flute mark on the cot was measured with a Top Roll Analyzer. If no flute mark remains after cooling or if the dial gauge moves only slightly without a measurable deflection, the cot passes the flute mark resistance test. If the depth of the flute mark depth measures 0.001 inch or more record actual reading, this is an "excessive" flute marking.

A cot with an excellent flute mark resistance will remain smooth and have a uniform surface. A cot with an excessive flute mark, however, will generate poor quality yarn, having imperfections caused by the uneven, flute marked surface of the cot.

Examples 3–6

These examples demonstrate the use of different polyamides. The processing procedures and compositions used in these examples were identical to Example 1, with the exception that the polyamide resin was replaced with different polyamides for each example. The cots obtained were tested with the following results:

|  | Ex. 3 | Ex. 4 |
|---|---|---|
| Polyamide Resin | Nylon 6.12 | Nylon 12 |
| Shore A Hardness | 87–88 | 87–88 |
| Clear Waste (mg/hr) | 5.58 | 5.27 |
| Ozone Resistance | Pass | Pass |
| Flute Mark Resistance | Pass | Pass |
| Fiber | Rating | Score |
| *Example 3 Lap Resistance:* | | |
| Cotton | Excellent | 30 |
| Rayon | Excellent | 30 |
| Cotton/Polyester | Excellent | 30 |
| *Example 4 Lap Resistance:* | | |
| Cotton | Excellent | 26 |
| Rayon | Excellent | 27 |
| Cotton/Polyester | Excellent | 28.5 |

|  | Ex. 5 | Ex. 6 |
|---|---|---|
| Polyamide Resin | Nylon 6 | Nylon Terpolymer[1] |
| Shore A Hardness | 87–88 | 85–86 |
| Clear Waste (mg/hr) | 7.75 | 6.20 |
| Ozone Resistance | Pass | Pass |
| Flute Mark Resistance | Pass | Pass |
| Fiber | Rating | Score |
| *Example 5 Lap Resistance:* | | |
| Cotton | Excellent | 28 |
| Rayon | Excellent | 24 |
| Cotton/Polyester | Excellent | 25 |
| *Example 6 Lap Resistance:* | | |
| Cotton | Excellent | 25 |
| Rayon | Good | 14 |
| Cotton/Polyester | Excellent | 21 |

[1]In Example 6 the Polyamide Resin was a Nylon terpolymer of 6, 6.6 and 12.

Example 7

In this example, a non-carboxylated NBR was used. Except for this substitution, the textile cot formulation and the processing procedures were the same as Sample A in Example 1. The non-carboxylated NBR had a acrylonitrile content of 28–31% and its Mooney viscosity range was 80 to 90 (ML-4, @ 100° C.). The fiber handling properties and physical properties of the cot were tested with the following results:

| Shore A Hardness | 87–88 |
|---|---|
| Clear Waste (mg/hr) | 6.4 |
| Ozone Resistance | Pass |
| Flute Mark Resistance | Pass |
| *Example 7 Lap Resistance:* | |
| Fiber | Rating | Score |
| Cotton | Excellent | 26.0 |
| Rayon | Excellent | 21.0 |
| Cotton/Polyester | Excellent | 22.5 |

Example 8

A carboxylated NBR with 7% carboxylation was used to prepare a cot having the formulation of the cot prepared and tested under Example 1. This carboxylated NBR had a Mooney viscosity of 40 (ML-4, @ 100° C.) and its acrylonitrile content was 35–40%. The processing procedures used to prepare the cot was the same used for Example 1. The cot was then tested for its fiber handling ability and physical properties. The following data was obtained:

| Shore A Hardness | 87–88 |
|---|---|
| Clear Waste (mg/hr) | 10.9 |
| Ozone Resistance | Pass |
| Flute Mark Resistance | Pass |
| *Example 8 Lap Resistance:* | |
| Fiber | Rating | Score |
| Cotton | Excellent | 24.0 |
| Rayon | Excellent | 22.0 |
| Cotton/Polyester | Excellent | 21.5 |

Example 9

To test an elastomer with the polyamide, a 70/30 NBR/polyvinyl chloride (PVC) blend was combined with the polyamide. The NBR/PVC blend (Paracil x3294 from Uniroyal Chemical Co.) had a Mooney viscosity of 79 to 92 (tested with a Mooney Viscometer set at ML-4, @ 100° C.); the bound acrylonitrile content was 32.6% (give or take 1.2%). The polyamide was used at 25 parts per hundred parts of the combined amount of the blend and polyamide.

Using the procedure described for Example 1, a cot having the following formulation was prepared:

| Ingredient | % By Wt. |
|---|---|
| NBR/PVC | 51.16 |
| Nylon 11 (Powder) | 17.05 |
| Plasticizer | 9.56 |
| Titanium Dioxide | 9.21 |
| Black Pigments | .2 |
| Antioxidant | 1.91 |
| Zinc Oxide | 3.41 |
| Accelerator[1] | 0.68 |
| Sulfur | 6.82 |

[1]The accelerator was N,N, diisopropyl benzothiazole sulfuramide.

Using the previously described procedures, the cot was tested and showed the following properties:

| Shore A Hardness | 88–89 |
|---|---|
| Clear Waste (mg/hr) | 9.0 |
| Ozone Resistance | Pass |
| Flute Mark Resistance | Pass |
| *Example 9 Lap Resistance:* | |
| Fiber | Rating | Score |
| Cotton | Excellent | 26.0 |
| Rayon | Excellent | 30.0 |
| Cotton/Polyester | Excellent | 25.0 |

Examples 10–13

For these examples, different polyamide concentrations were combined with the NBR rubber.

To prepare the cots of Examples 10–13, the blending process of these samples were done using a single screw extruder made by the American Buss Inc. The NBR rubber and the nylon resins were fed into the extruder along with the antioxidants. The plasticizers were injected into the extruder from another zone. During the mixing process, the temperature of the extrudate was controlled to no higher than 220° C. and the extrudates were immersed in cold water as soon as the extrudates exited the extruder. After the blended materials were cooled to room temperature, the vulcanization reagents were mixed into the stock using an internal mixer. The cot fabrication procedures followed the same steps as indicated in Example 1.

Cots having the following formulations were prepared (given in % by wt.):

|  | Ex. 10 | Ex. 11 | Ex. 12 | Ex. 13 |
|---|---|---|---|---|
| Cbx. NBR Rubber[1] | 39.0 | 45.5 | 52.0 | 55.3 |
| Nylon 6 | 26.0 | 19.5 | 13.0 | 9.70 |
| Plasticizer | 14.3 | 14.3 | 14.3 | 14.3 |
| Titanium Dioxide | 8.8 | 8.8 | 8.8 | 8.8 |
| Black Pigments | 0.2 | 0.2 | 0.2 | 0.2 |
| Antioxidant | 1.3 | 1.3 | 1.3 | 1.3 |
| Zinc Oxide | 3.25 | 3.25 | 3.25 | 3.25 |
| Accelerator[2] | 0.65 | 0.65 | 0.65 | 0.65 |
| Sulfur | 6.5 | 6.5 | 6.5 | 6.5 |

[1]The Cbx. NBR (carboxylated acrylonitrile-butadiene rubber) had 1% carboxylation.
[2]The accelerator was N,N diisopropyl benzothiazole sulfuramide.

Properties measured for these examples follow:

|  | Ex. 10 | Ex. 11 |
|---|---|---|
| Shore A Hardness | 92–93 | 87–88 |
| Clear Waste (mg/hr) | 7.20 | 7.75 |
| Ozone Resistance | Pass | Pass |
| Flute Mark Resistance | Pass | Pass |

| Fiber | Rating | Score |
|---|---|---|
| Example 10 Lap Resistance: | | |
| Cotton | Excellent | 28.5 |
| Rayon | Excellent | 27.0 |
| Cotton/Polyester | Excellent | 24.0 |
| Example 11 Lap Resistance: | | |
| Cotton | Excellent | 28.0 |
| Rayon | Excellent | 22.5 |
| Cotton/Polyester | Excellent | 24.5 |

|  | Ex. 12 | Ex. 13 |
|---|---|---|
| Shore A Hardness | 83–84 | 77–78 |
| Clear Waste (mg/hr) | 7.46 | 8.91 |
| Ozone Resistance | Pass | Pass |
| Flute Mark Resistance | Pass | Pass |

| Fiber | Rating | Score |
|---|---|---|
| Example 12 Lap Resistance: | | |
| Cotton | Excellent | 30.0 |
| Rayon | Good | 16.0 |
| Cotton/Polyester | Excellent | 20.0 |
| Example 13 Lap Resistance: | | |
| Cotton | Excellent | 22.0 |
| Rayon | Good | 12.0 |
| Cotton/Polyester | Good | 13.0 |

Examples 14—16

In these examples, a polyether-polyamide copolymer (PEA) was used to make textile cots having good fiber handling properties and physical properties. Copolymers of different polyamide contents were selected to blend with NBR rubbers to make textile cots. Listed below are formulations used in this example (the amounts are given in percent by wt.).

|  | Ex. 14 | Ex. 15 | Ex. 16 |
|---|---|---|---|
| Cbx. NBR[1] | 54.04 | 54.18 | 52.62 |
| PEA-1[2] | 21.62 | 18.97 | — |
| PEA-2[3] | — | — | 21.05 |
| Plasticizer | 8.11 | 8.13 | 10.52 |
| Titanium Dioxide | 5.94 | 7.32 | 5.79 |
| Pigments | 0.19 | 0.18 | 0.18 |
| Antioxidants | 1.62 | 2.71 | 1.58 |
| Zinc Oxide | 2.70 | 2.71 | 2.63 |
| Accelerator[4] | 0.38 | 0.38 | 0.37 |
| Sulfur | 5.40 | 5.42 | 5.26 |

[1]The NBR had (1%) carboxylation.
[2]PEA-1 of Examples 14 and 15 was a polyether-polyamide copolymer containing about 25 to 30% polyamide. Example 14 thus had approximately 5.4–6.5% of the polyamide while Example 15 had approximately 4.7–5.7% of the polyamide in the cot.
[3]PEA-2 of Example 16 was polyether-polyamide copolymer containing 40–45% polyamide thus giving the cot a polyamide concentration of approximately 8.4–9.47%.
[4]The accelerator was N,N; diisopropyl benzothiazole sulfuramide.

For these examples, the PEA and Cbx. NBR was blended using a Banbury mixer. The Banbury temperature during the blending process was controlled to 290° F. for PEA-1 and 330° F. for PEA-2. In each case the temperature was slightly higher than the melting temperature of the polyether/polyamide copolymer. After the PEA polymers, NBR rubber and other ingredients of each formulation were mixed uniformly. The mixed stocks were fabricated into cots in accordance with the procedures described for Example 1.

Listed below are performance testing results which compare the effect of polyamide content on performance of cot samples containing no animal glue.

|  | Ex. 14 | Ex. 15 | Ex. 16 |
|---|---|---|---|
| Shore A Hardness | 74–75 | 75–76 | 86–87 |
| Clear Waste (mg/hr) | 8.07 | 8.20 | 7.67 |
| Ozone Resistance | Pass | Pass | Pass |
| Flute Mark Resistance | Pass | Pass | Pass |

| Fiber | Rating | Score |
|---|---|---|
| Example 14 Lap Resistance: | | |
| Cotton | Good | 12.0 |
| Rayon | Good/Fair | 10.0 |
| Cotton/Polyester | Good/Fair | 10.0 |
| Example 15 Lap Resistance: | | |
| Cotton | Good | 16.0 |
| Rayon | Fair/Poor | 5.0/0 |
| Cotton/Polyester | Fair | 2.5 |
| Example 16 Lap Resistance: | | |
| Cotton | Excellent | 25.0 |
| Rayon | Excellent | 24.0 |
| Cotton/Polyester | Excellent | 23.0 |

By comparing the results of Examples 14–16, the importance of the polyamide concentrations in the cot formulation can be seen. When the polyamide concentration is less than about 9% of the rubber and polymer combination the fiber handling properties of the resulting cot starts to fall off.

Preferably, therefore, the polyamide concentration is at least about 9% by weight of the combined weight of the rubber and polymer. This is noted in Examples 14–16 which use polyamide copolymers.

Comparative Example 17

This example is included to provide a comparison between the fiber-working elements of the instant invention and a cot made with an elastomeric mixture which includes animal glue, an ingredient which is known and utilized in cots and aprons for its good fiber and yarn handling properties. The similarity of the formulation of this Comparative Example to the formulation used for the cot of Example 1 can be noted. The formulation of the cot which was used was as close as possible to the formulation of the cot made and tested under Example 1, while also including the amount of animal glue needed for good fiber handling properties.

The technology for the preparation of the animal glue-containing cot is well known in the art (note U.S. Pat. Nos. 2,450,409 and 2,450,410).

The animal glue cot had the following formulation:

|  | % by Wt. |
| --- | --- |
| Carboxylated NBR Rubber[1] | 48.83 |
| Animal Glue | 24.41 |
| Plasticizer | 9.77 |
| Titanium Dioxide | 6.59 |
| Black Pigment | 0.15 |
| Processing Aid[2] | 2.44 |
| Zinc Oxide | 2.44 |
| Accelerator[3] | 0.49 |
| Sulfur | 4.88 |

[1]The rubber was the same as was used for Example 1.
[2]The processing aid was polyethylene glycol.
[3]The accelerator was N,N, diisopropyl benzothiazole sulfuramide.

The properties of the cot were then tested using the procedures used for Example 1. The results of these tests are given below.

| Comparative Example 17 Lap Resistance: | | |
| --- | --- | --- |
| Fiber | Rating | Score |
| Cotton | Excellent | 22.0 |
| Rayon | Good | 12.0 |
| 65/35 Cotton/Polyester | Good | 13.0 |
| Clear Waste (mg/hr) |  | 13.2 |

| Yarn quality (measured for 30 count 100% cotton yarns) | |
| --- | --- |
| % CV | 13.5 |
| Thins | 9.0 |
| Thicks | 39.0 |
| Neps | 34.0 |
| Break factor | 2804.0 |

By comparing the lap resistance and clearer waste generated in testing this glue containing cot to the results of the fiber handling properties of other examples, it is revealed that better fiber handling properties can be obtained using polyamide/NBR compositions. Significantly, the cot of Example 1 (which had the formulation closest to Comparative Example 17) had lower % CV and a clearer waste value of only 6.35 mg/hr (milligrams per hour); a much better value than is seen from the glue-cot.

Example 18

Aprons were made using the polyamide/NBR composition. The aprons were fiber reinforced and two-layered with both a jacket and a liner. The formulation used in Example 1 was used to prepare the jacket and the formulation of Example 8 was used as the liner.

The procedure previously given for the cots was used to mix the apron compositions. In following this procedure, after making the jacket blend and the liner blend, the liner stock was extruded into a tube shape. The outer diameter (OD) of the liner was 1.48 inches (in.) and the thickness was 0.020 in. (the liner having a size which, after cord was applied, would allow it to be snugly fitted inside the particular jacket which was made for it).

The liner was then put onto a mandrel and a cord which was 3 plies, 40 counts and made of cotton threads was then wound around the liner on its outer surface. A phthalate ester plasticizer had been used to saturate the cord in order to improve the adhesion of the cord to the liner surface. The cord was wound so that it encircled the liner surface in a spiral-like,manner forming loops around the liner. The winding was done by machine in a uniform manner which made 30 loops of the cord per inch. A single length of cord was used for the entire length of the liner.

The blend for the jacket was separately extruded into a tube having a thickness of 0.050 in. and a 1.50 inch inner diameter (ID). The jacket tubing was fitted onto the cord-wound liner tube. The entire two-layer, cord reinforced tube was then wrapped with a nylon strip and was cured in an oven at 320° F. for 50 minutes. After vulcanization the two-layer tube was unwrapped and finished into aprons. The outer surface of the tube's jacket was ground to achieve a smooth, fiber-working surface. Individual ring-like, apron belts were then cut from the two-layer cylindrical tube; each apron was 0.042 in. thick with an endless, smooth, fiber-working, outside surface which measured 1.25 in. wide, the aprons being cylindrical in shape.

Properties which were measured for these polyamide/NBR apron:

|  | Jacket | Liner |
| --- | --- | --- |
| working surface smoothness[1] | 1.37 | N/A |
| abrasion resistance DIN Abrasion test[2] | 41 mm$^3$ | 30 mm$^3$ |
| ozone resistance | pass 8 hrs. | pass 14 hrs. |

[1]Surface smoothness was measured using a smoothness tester (Penthometer M4P, manufactured by RAPP Industrial). The RA value is the arithmetic mean between the high and low points of the surface measured by the instrument.
[2]This test was done in accordance with the German DIN 53516 method for abrasion resistance. The instrument used was a Zwick 6102 Abrasion Tester (manufactured by Zwick America Inc.) with a grinding distance of 40 meter, without additional load applied. The results above are reported in cubic millimeters.

Example 19

The following examples (A–F) demonstrate the undesirability of the halide additives (halides of Li, magnesium, calcium, etc.) in textile cots (or aprons). The examples show positively that halide additives detrimentally affect the yarn working properties of textile working surfaces that are made of polyamide and NBR.

Textile cots were made to test compositions having halide additives. Cot A was the control, and contained no additive. Cots B–F contained halide additives to compare their performance to the performance of textile cots which do not contain such additives.

In general the cots were prepared in accordance with the procedure described for Example 1 of the application Cot A was mixed exactly as is described for Example 1 above, and cots B–F were mixed by combining the nylon powder and halides by hand and then feeding the combination along with all of the other ingredients (except the curing package) into a single screw extruder (made by American Buss, Inc.). The extruder temperature was controlled at about 200° C. In the extruder, the combined ingredients blended and fused homogeneously. After the extrudate cooled, it was put on a two roll mill and the curing package (zinc oxide, sulfur, and the accelerator) was added and mixed uniformly into the extrudate. Thereafter, the processes for all of the cots (A–F) exactly followed the process described for Example 1 of the application.

The samples (A–F) all were made with carboxylated NBR and Nylon 11 at a 70 to 30 weight ratio respectively. The same plasticizer, $TiO_2$, carbon black, antioxidant, ZnO, accelerator, and sulfur were used and were added in the same amount for all of the samples. Their amounts (in parts by weight per 100 parts of the Nylon and NBR combined are:

| | Sample and Amounts | | | | | |
|---|---|---|---|---|---|---|
| Ingredient | A | B | C | D | E | F |
| plasticizer | 14 | 14 | 14 | 14 | 14 | 14 |
| LiCl | — | 4.0 | 2.0 | — | — | 3.0 |
| MgCl | — | — | — | 4.0 | 3.0 | — |
| MgO | — | — | — | — | 4.0 | 8.0 |
| $TiO_2$ | 13.5 | 13.5 | 13.5 | 13.5 | 13.5 | 13.5 |
| C-black | .3 | .3 | .3 | .3 | .3 | .3 |
| antioxidant | 2.8 | 2.8 | 2.8 | 2.8 | 2.8 | 2.8 |
| ZnO | 5.0 | 5.0 | 5.0 | 5.0 | 5.0 | 5.0 |
| accelerator | 1.0 | 1.0 | 1.0 | 1.0 | 1.0 | 1.0 |
| sulfur | 10.0 | 10.0 | 10.0 | 10.0 | 10.0 | 10.0 |

Cot sample A has a composition similar to Example 1 of our patent application.

The amounts of the halide salt added to cots B–F were within the amounts required in U.S. Pat. No. 4,508,867.

Cots A–F were then tested for their yarn lapping resistance. The yarn lapping resistance test used is previously described. The results of the test are:

| | Cot Samples | | | | | |
|---|---|---|---|---|---|---|
| Fiber | A | B | C | D | E | F |
| Cotton | Excellent | Poor | Poor | Poor | Fair | Poor |
| Rayon | Good | Poor | Poor | Poor | Poor | Poor |
| 65/35* | Excellent | Poor | Poor | Poor | Fair | Poor |

*Note the 65/35 was a blend which was 65% by weight polyester and 35% by weight cotton.

The addition of halides to the polyamide/rubber composition detrimentally affects the fiber handling property of the composition. The halides make the surface less suitable to be used as textile drafting elements (cots and aprons), especially compared to the results of the present compositions which do not have such additives. Much better textile drafting elements are made when the surface layer does not contain the halide salt.

Observation of the cot samples also revealed that cots B–F all had wet spots on their surface. This wetness appeared to be related to the hygroscopic nature of the halide material. The lithium chloride is more hygroscopic than magnesium chloride, and the wetness of the cot samples went according to the following order:

B>C>F>D>E

In comparison, cot A had a dry surface.

In addition to this, the cot of the present invention, cot A, was also superior to cots B–F in surface smoothness. It was noted that cots B–F had "pin-holes" on their surface, which possibly were caused by the absorption of water in the composition. This lack of surface smoothness is also an undesirable characteristic in textile fiber working units. The surface of a textile fiber working unit should be smooth so that the best fiber control can be provided. The poor surfaces of cots B–F will certainly increase the probability of lapping loose fibers. Additionally, the pin holes on the surfaces of cots B–F are a dust and particle trap, which also adds to the problem.

The cots of the present invention are much better than the cots which contain the halide additive; undesirable additives for elements in a drafting system for making high quality yarn.

What is claimed is:

1. A textile cot comprising at least one layer, said layer having an outer surface which is a fiber-working surface with an endless path, wherein the layer is cylindrical and forms a ring, the layer being a composition consisting essentially of a mixture which contains no halide salt and further contains a polyamide at an amount of from about 9 to about 40% by weight of the composition, acrylonitrilebutadiene rubber at an amount of at least about 30% by weight of the composition, a plasticizer, a stabilizer, a crosslinking agent for the rubber, and optionally a filler up to a maximum amount of about 30% by weight of the composition further providing that the composition forms a smooth fiber-working surface and gives lap resistance to the fiber-working surface.

2. A textile cot as described in claim 1 wherein the polyamide is a copolymer which has the amide moiety present at an amount of at least about 9% by weight of the polyamide and acrylonitrilebutadiene rubber.

3. A textile cot as described in claim 1 wherein the polyamide is a homopolymer which is present at an amount in the range of from about 15 to about 40% by weight of the composition.

4. A textile cot as described in claim 1 wherein the acrylonitrilebutadiene rubber is present at an amount in the range of from about 40 to about 82% by weight of the composition.

5. An apron which can function as a replaceable unit in a textile fiber drafting and spinning machine comprising at least one layer shaped as a cylindrical ring, said layer having an outer surface which is a fiber-working surface on the cylindrical ring, said fiber-working surface having an endless path, wherein further the layer is a composition consisting essentially of a mixture which contains no halide salt and further has a polyamide at an amount of from about 6 to about 40% by weight of the composition, an acrylonitrilebutadiene rubber at an amount of at least about 30% by weight of the composition, a plasticizer, a crosslinking agent for the rubber, and optionally a filler up to a maximum amount of about 45% by weight of the composition, further providing that the composition forms a smooth fiber-working surface.

6. An apron as described in claim 5 which further has a second layer which is formed by a polymer, this second layer being a liner, the said liner being inside and fixed to the first layer as part of the cylindrical ring, the first layer being a jacket.

7. An apron as described in claim 6 which further contains a reinforcing cord.

8. An apron as described in claim 5 wherein the crosslinked acrylonitrilebutadiene rubber has an acrylonitrile content in the range of from about 10 to about 70% by weight.

9. An apron as described in claim 5 wherein the composition also contains a stabilizer, an antioxidant and a pigment.

10. A process for making a lap resistant, fiber-working layer for a textile cot comprising mixing a composition with shear at a temperature sufficiently high to form a uniform blend, where the composition consists essentially of a mixture having no halide salt and having a polyamide at an amount of from about 9 to about 40% by weight, an acrylonitrilebutadiene rubber at an amount of at least about 30% by weight, a plasticizer, a stabilizer, a crosslinking agent, and optionally a filler up to a maximum amount of about 30% by weight; extruding the uniform blend to form a shape, heating the shape at a temperature sufficient to crosslink the rubber, and then finishing the shape into a layer with an outer, smooth fiber-working surface having an endless path, wherein further the layer forms a cylindrical ring.

11. A process as described in claim 10 wherein the uniform blend was obtained by combining the polyamide and the acrylonitrilebutadiene rubber with shear and a temperature sufficient to soften the polyamide and to blend the rubber and polyamide, and then combining the plasticizer and the crosslinking agent and continuing to mix with shear to form the uniform blend.

12. A process as described in claim 11 wherein a stabilizer is also combined with the plasticizer and crosslinking agent.

13. A process as described in claim 10 which was mixed by combining the polyamide, the acrylonitrilebutadiene rubber, the plasticizer, the crosslinking agent, and a stabilizer, and forming the uniform blend.

14. A process as described in claim 12 wherein an antioxidant and a pigment was also combined with the stabilizer, plasticizer and crosslinking agent.

15. A process as described in claim 10 wherein the blend was worked into the shape of a cylinder by extruding the blend.

16. A process for making an apron which can function as a replaceable unit in a textile fiber drafting and spinning machine comprising mixing a composition with shear at a temperature sufficiently high to form a uniform blend, where the composition consists essentially of a mixture having no halide salt and having a polyamide at an amount of from about 6 to about 40% by weight, an acrylonitrilebutadiene rubber at an amount of at least about 30% by weight, a plasticizer, a stabilizer, a crosslinking agent, and optionally a filler up to a maximum amount of about 45% by weight, extruding the uniform blend to form a shape, heating the shape at a temperature sufficient to crosslink the rubber, and finishing the shape into a layer with an outer, fiber-working surface having an endless path, the said layer also having a cylindrical shape.

17. A process as described in claim 16 wherein the layer is a jacket which is fitted to a cylindrical polymer liner to form a two-layered cylinder, and finishing the jacket to give the jacket the smooth fiber-working surface.

18. A process as described in claim 17 wherein the cylindrical polymer liner has a reinforcing cord wound around the liner whereby the two-layered cylinder contains the reinforcing cord.

* * * * *